2,987,491
ALKYD RESINS MODIFIED BY BETA AMINO CROTONIC ESTERS OF HIGHER ORGANIC HYDROXIDES
Alfred R. Bader, Milwaukee, Wis., and Henry A. Vogel, Richland Township, Pa., assignors to Pittsburgh Plate Glass Company
No Drawing. Filed Aug. 7, 1956, Ser. No. 602,489
11 Claims. (Cl. 260—22)

This invention relates to beta amino derivatives of crotonic acid esters of higher alcohols, useful as surfactants or for use in preparing the same, and for other purposes. Such esters are of the general formula:

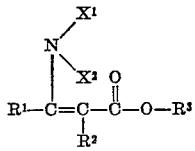

where $R^3$ is the residue of a higher alcohol. The character of it and of the groups $R^1$, $R^2$, $X^1$ and $X^2$ will subsequently be more fully elaborated upon.

The beta amino crotonic acid esters of higher alcohols are most readily formed by action of ammonia or a primary or secondary amine upon the corresponding beta hydroxy crotonic acid esters of higher alcohols, which exist tautomerically with beta carbonyl esters of such alcohols in accordance with the equilibrium equation:

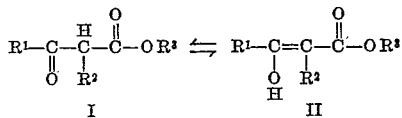

If the equilibrium system is treated with a basic nitrogen compound such as ammonia or a primary or secondary amine, in accordance with the provisions of the present invention, the component of the system designated as II reacts with the nitrogen compound in accordance with the equation:

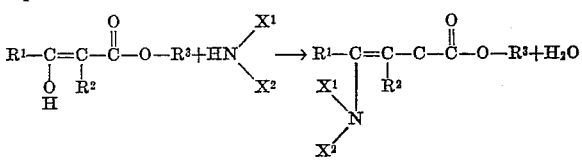

In the reaction, the group $R^3$ preferably, though not necessarily, contains at least 12 and usually 16 or 18 and upward, carbon atoms. In the reaction, the enolized ester is removed by formation of amine, the equilibrium in the equilibrium equation is displaced to the right and the reaction advances.

In the equation, if ammonia is employed as the basic nitrogen compound, $X^1$ and $X^2$ will be hydrogen. However, it is apparent that ammonia may be replaced by primary or secondary amines, or diamines. Therefore, $X^1$ and/or $X^2$ may be alkyl or aryl groups. If desired, ammonia may also be replaced by aqueous ammonium hydroxide and salts thereof with acids, notably weak acids such as acetic acid, carbonic acid and the like.

The starting beta carbonyl ester of a higher alcohol may conveniently be prepared by the technique disclosed in commonly owned Patents 2,693,476 and 2,693,484 which were co-pending with application, Serial No. 280,646, filed April 4, 1952, now abandoned. The processes as disclosed in the patents comprise reacting an ester of a beta carbonyl acid such as acetoacetic acid and a lower aliphatic alcohol, such as methyl alcohol or ethyl alcohol, with a higher alcohol to effect ester interchange. Higher alcohols which may be used in forming the starting esters may be, for example, those obtained by the reduction of fatty acids from fatty, animal or vegetable glycerides, or they may be obtained from tall oil, or from wool grease and the like. The esters may also be of glycerides of higher hydroxy acids such as ricinoleic acid, or they may be sterols or steroid bodies and the like.

For purposes of illustration, partial lists of substituents for the groups $R^1$, $R^2$ and $R^3$, X and $X^2$ in the foregoing formulae will now be given.

For the group $R^1$, the list comprises:

TABLE A

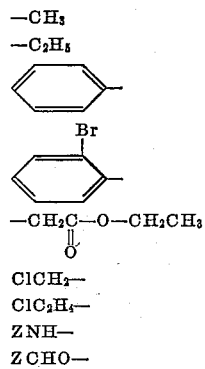

(Z being methyl, ethyl, phenylene, etc.)

Similarly, the group $R^2$ is common to the starting ester and its product and may be hydrogen or it can also be a group such as is listed in Table B:

TABLE B

| | |
|---|---|
| Methyl | Amino |
| Ethyl | Chloromethyl |
| Propyl | Benzyl |
| Butyl | Phenyl |
| Chloro | | or chloro or the like derivatives thereof. Only one hydrogen atom of the alpha-carbon atom of the beta carbonyl esters can be replaced by substituents.

In the initial or starting beta-carbonyl ester, which is subjected to ester interchange to introduce the group $R^3$, the group to be replaced, is the residue of a lower alcohol such as methyl, ethyl, n-propyl, isopropyl, butyl, tertiary butyl, secondary butyl, allyl, methallyl, crotyl, propargyl, 2-chloro-ethyl, 2-fluoroethyl, 2-nitropropyl, or the like.

Appropriate alcohols for ester interchange reaction with beta-carbonyl esters of lower alcohols, as disclosed in the previous application, include alcohols from the following table:

TABLE C

Lauryl alcohol
Stearyl alcohol
Oleyl alcohol
Octadecyl alcohol
Ceryl alcohol
Cetyl alcohol
Carnaubyl alcohol
Lignoceryl alcohol
Castor oil containing glycerides of ricinoleic acid
Polyethylene glycols having molecular weights of 200, 300 or more
Higher alcohols containing the hydrogenated phenanthrene nucleus such as:
  Cholesterol
  Beta-sitosterol
  Stigmasterol
  Cholestanol Epidehydroandrosterone
Ergosterol
Epicholestanol
Coprostanol
Cortisone
Cholic acid
Desoxycholic acid
Steroid sapogenines
Steroid intermediates
Triterpene alcohols such as:
Agnosterol
Lanosterol These higher alcohols when admixed with a beta-carbonyl ester of a lower alcohol such as methyl, ethyl, propyl or butyl alcohol, even under mild conditions, and in the absence of catalysts, can readily be induced to undergo ester interchange reaction thus liberating lower alcohol and forming an ester of the beta-carbonyl acid and the higher alcohol.

Beta-carbonyl esters of lower alcohols suitable for use in the foregoing ester interchange reaction include the esters of any of the lower alcohols already listed and beta-carbonyl acids such as the following:

TABLE D

Acetoacetic acid
Alpha-ethyl acetoacetic acid
Alpha-isopropyl acetoacetic acid
Alpha-methyl acetoacetic acid
Benzoyl acetoacetic acid
Acetone dicarboxylic acid
Gamma chloro acetoacetic acid
Alpha-benzoyl acetoacetic acid
Alpha-phenyl-acetoacetic acid
Chloro, iodo, and bromo substitutions products of the above acids
Acetyl succinic acid
Benzoyl acetoacetic acid
The acid of the formula:

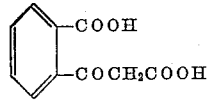

and the like.

To obtain the higher esters of beta-carbonyl acids, the previously mentioned procedures of Patents 2,693,476 and 2,693,484 may be followed. Accordingly, the disclosures of the foregoing patents insofar as they pertain to preparation of such esters, are to be regarded as constituting parts of this application. However, it is to be understood that the practice of the invention is not necessarily limited to esters prepared by the techniques of the foregoing patents. Esters of higher alcohols and beta-carbonyl acids (or the tautomeric enolic forms thereof) however prepared, when of sufficient purity, can be reacted with ammonia or primary or secondary amines in the practice of this invention.

Since the method outlined in the foregoing patents is so simple and produces such excellent results, it is believed to be in order briefly to describe it.

Main features of the foregoing process comprise:

(I) So conducting the reaction of ester interchange that minimum concentration of evolved alcohol is built up in the system.

(II) Operating with at least a molar equivalency and preferably a substantial molar excess, e.g., with 2 to 100 moles of aceto carbonyl ester of a lower alcohol per mole of higher alcohol. Condition I is readily met by use of a large excess of the starting ester in order to displace the equilibrium of the reaction system in the desired direction by reason of the excess of such ester of a lower alcohol. The reaction can also be promoted by application of vacuum or by blowing the reaction mixture with a non-reactive gas such as nitrogen, carbon dioxide, combustion gases or other inert gas in order to sweep out evolved alcohol from the system and thus to promote the reaction. Non-reactive solvents boiling within the reaction temperature range, and that by distillation would carry away the evolved alcohol, may be employed in the system and have an effect similar to non-reactive gases.

If these conditions are observed, the reaction will proceed very efficiently at temperatures of about 80° C. to 120° C. or 140° C., even in the absence of catalysts, to effect yields of the esters of the higher alcohols and the beta-keto acids which are nearly theoretical.

Excesses of the starting ester can easily be distilled from the desired product by vacuum (for example, at about 5 mm. to 100 mm. of mercury absolute pressure) thus providing beta-carbonyl esters of a higher alcohol and tautomeric enolic forms thereof, which can be reacted with ammonia or primary or secondary amines to form beta-amino crotonic acid esters of the type herein disclosed.

Appropriate basic nitrogen compounds that will replace the enolic hydroxyl in the higher esters of beta-carbonyl acids may be selected in accordance with the following table:

TABLE E

Ammonia (gaseous or in a non-reactive solvent)
Aqueous ammonium hydroxide
Salts of ammonia such as:
    Ammonium acetate
    Ammonium carbonate
Primary amines such as:
    Methyl amine
    Ethyl amine
    Propyl amine
    Butyl amine
    Aniline
    Toluidine
Secondary amines such as:
    Dimethyl amine
    Dipropyl amine
    Dibutyl amine
    Methyl aniline
Diamines such as:
    Dimethyl amine
    Diethyl amine
    Dipropyl amine
    Dibutyl amine
Alphyl amines such as:
    Benzyl amine
    Dibenzyl amine In conducting the reaction of the beta-carbonyl esters of higher alcohols and ammonia or amines as herein disclosed, the conditions of reaction are very simple. If the beta-carbonyl ester of a higher alcohol is liquid at the conditions of reactions, solvent media are not required for the reaction though, of course, they are permissible. However, since many of the beta-carbonyl esters of higher alcohols are of relatively high melting point, or are very viscous liquids at the temperature of reaction contemplated herein, it is often desirable to include a non-reactant solvent or diluent in the system. Preferably, the solvent is of farily low boiling point so that it may be easily eliminated from the system by distillation at the conclusion of the reaction without decomposing the ester product or any residual starting ester still in the system.

It is often desirable to include in the system, an appropriate catalyst to promote the reaction between the ammonia or amine and the beta-carbonyl ester of a higher alcohol. Appropriate catalysts include salts of ammonia or of the amine which is employed in the system. Such salts include ammonium or amino acetates, nitrates, chlorides, sulfates, sulfites, phosphates, phosphites, and the like. These catalysts may be employed in trace amounts, e.g., 0.01 part by weight per 100 parts by weight of the beta-carbonyl ester of a higher alcohol undergoing amination.

It is also within the purview of the invention to include the salt in an amount to supply a substantial amount of, or even all, of the ammonia required in the reaction. Any desired intermediate amount of salt may be employed but must be supplemented by sufficient ammonia or amine to react with carbonyl oxygen or its enolic tautomer.

The reaction can be run at temperatures ranging from about zero to 100° C. or 120° C. The reaction can usually be effected within a period of 5 minutes to 12 hours. Longer periods would be permissible, but are usually unnecessary and uneconomical. Approximately one hour is considered to constitute a good, average working period. While catalysts such as ammonium acetate or ammonium nitrate may be employed to promote the speed of reaction, if such speed is not important, no catalyst need be incorporated. The reaction can be conducted at atmospheric pressure or under superatmospheric pressures, for example, under a pressure of 10 to 100 pounds per square inch (above atmospheric) if so desired.

The beta-amino crotonic acid esters as herein disclosed, may be purified in substantially any convenient manner. For example, the reaction mixtures including said beta-amino crotonic esters together with solvents and any unreacted starting materials or impurities, can be subjected to distillation in order to recover the desired beta-amino crotonic ester product and/or any valuable by-products.

If the beta-amino crotonic acid ester of a higher alcohol is insoluble in water, this characteristic can be employed in order to effect concentration or purification thereof. For example, the beta-keto ester of a higher alcohol dissolved in a suitable solvent may be treated with ammonia in the presence of a catalytic amount of ammonium acetate or with a molecular amount of ammonium acetate in order to form the desired beta-amino crotionic ester. The reaction, for example, may be conducted at 20° C. to 100° C. and after the completion thereof, the reaction mixture is agitated with water in order to separate out the water-insoluble beta-amino crotonic acid ester. The latter may be washed with water in order to remove residual impurities and it is then dried.

Beta-amino crotonic acid esters prepared as herein disclosed, may, if desired, be treated with organic acids and inorganic acids such as acetic acid, oxalic acid, phthalic acid, chloroacetic acid, hydrochloric acid, sulfuric acid, nitric acid, and the like, in order to form ammonium salts. They may also be treated with fatty acids of glyceride oils and tall oil acids to form soaps and even physical mixtures useful as emulsifying agents.

The following examples illustrate the application of the principles of the invention to the preparation of beta-carbonyl esters of the higher alcohols.

*Example I*

In this example, 60 grams of stearyl acetoacetate, prepared by the ester interchange of methyl or ethyl acetoacetate and stearyl alcohol, dissolved in 300 grams of methanol and 50 grams of ammonium acetate, were heated on a steam bath for 15 minutes. The reaction mixture was then cooled and diluted with water. There was isolated 60 grams of a white solid having a melting point of 70° C. to 71° C. In absolute methanol, it showed an ultra-violet light absorption maximum of log E 4.29 at 274 millimicrons. The theory involved in such determination is outlined on page 4 of Chemical Spectroscopy, by Wallace Brode, second edition, published by John Wiley and Sons. The compound has the structural formula:

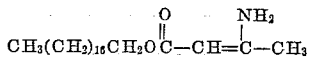

The molecular weight of the compound was 360. It was of increased water solubility. It could be employed as an emulsifying agent for mineral oils and other hydrophobic materials. The compound could be treated with acids such as hydrochloric acid, acetic acid, fatty acids of glyceride oils, chloroacetic acid or the like, in order to form salts.

*Example II*

In this example, the ester of polyethylene glycol and acetoacetic acid may be prepared by ester interchange between the glycol and methyl acetoacetate. An appropriate reaction mixture comprises 100 grams of polyethylene glycol of an average molecular weight of about 200 and 200 to 400 grams of methyl acetoacetate. Such mixture is heated on a steam bath for 15 hours, preferably under slight negative pressure. The excess methyl acetoacetate and any residual methyl alcohol may be removed by vacuum distillation to obtain 150 grams of a water soluble liquid. Such product is polyethylene acetoacetate having a saponification value of 359.

Polyethylene acetoacetate from polyethylene glycol prepared as described, is incorporated in an amount of 33 grams into 100 grams of methanol to which 0.05 gram of ammonium acetate is added. Ammonium gas is then passed into the mixture at room temperature for one hour. The reaction is somewhat exothermic. At the conclusion of the foregoing period, the solvent is stripped off under reduced pressure. There remains a light yellow oil (33 grams) which has an absorption maximum in chloroform of log E 4.19 at 273 mu. Small amounts of this material with or without additions of higher fatty acids will emulsify mineral oils.

*Example III*

In this example, 50 grams of cold, pressed castor oil (largely the triglyceride of ricinoleic acid) and 150 grams of methyl acetoacetate are heated in an open necked glass flask on a steam bath for a period of 4 hours. The mixture at that point is a clear solution which is stripped of methyl acetoacetate and residual methyl alcohol by distillation at 10 millimeters mercury pressure (absolute) to leave a light yellow oil weighing 62 grams. This product is castor oil acetoacetate which shows upon infrared analysis, the complete absence of hydroxyl groups.

Castor oil acetoacetate prepared as described and in an amount of 100 grams is dissolved in 100 grams of methanol to which 0.1 gram of ammonium acetate has been added. Ammonia gas is passed through the reaction mixture for two hours, at the conclusion of which time the solvent is removed by distillation. The product is amino caster oil crotonate which is assumed to have a molecular weight of 1200. Upon this assumption, it has absorption maximum in chloroform of log E 4.5 at 272.5 mu.

The amino castor oil crotonate can be used, with or without additions of higher fatty acids, to emulsify mineral oils with water.

*Example IV*

This example illustrates the application of the principles of the invention in order to form modifications of alkyd resins such as are used in the coating arts. An alkyd body containing free hydroxyls should be employed for reaction by ester interchange with an ester of acetoacetic acid and a lower monohydric alcohol. In the practice of the invention, an appropriate alkyd resin may be prepared by esterification of 1053 grams of linseed oil, 470 grams of glycerine and 893 grams of phthalic anhydride by heating the mixture while blowing it with inert gas, e.g., gases from the combustion of butane. Water is evolved and the reaction is continued until it ceases, or until the reaction product becomes viscous, for example, has the viscosity of M when it is diluted to a solids content of 57.6 percent in solvent naphtha. This alkyd body is of an acid value of 10.5; it contains unreacted hydroxyls and is suitable for reaction with methyl or ethyl acetoacetate by ester interchange to form an acetoacetic acid ester of the alkyd body.

For example, a mixture comprising 100 grams of the alkyd body containing 57.6 percent by weight of solids dissolved in naphtha is admixed with 500 milliliters of methyl acetoacetate and is heated on a steam bath for 18 hours. All of the solvent is then removed from the reaction mixture by distillation in vacuum and to the hot resin, 500 grams of solvent naphtha is added. The resultant solution has a Gardner viscosity of U to V at 50.4 percent solids. The resin in naphtha or similar solids is treated with ammonia gas preferably in the presence (though not necessarily so) of a small amount of ammonium acetate. Ammonia, preferably as a gas, is passed into the solution of acetoacetic acid modified alkyd body for a period of about two hours.

The product is an alkyd body which is modified by the beta-amino crotonate groups.

The alkyd could be replaced by other alkyd bodies containing available hydroxyls. Those alkyds resulting from esterification reaction of di- and polyhydric alcohols such as ethylene glycol, diethylene glycol, propylene glycol, butylene glycol, glycerol, pentaerythritol, manitol, trimethylol propane and others may be so employed. Mixtures of two or more alcohols may be employed. The dicarboxylic component may also be of such acids as isophthalic acid, terephthalic acid, succinic acid, adipic acid, sebacic acid, azelaic acid, or the like. Mixtures of any two or more of the acids and/or any one or more of the alcohols may also be employed. Fatty acid components may be present in the alkyd and include such fatty acids as stearic acid, palmitic acid, oleic acid, ricinoleic acid, linolenic acid, linoleic acid, elaeostearic acid and others. The fatty acids in amounts conventional in alkyd resin manufacture may be added to the other reactants as free acids or as partial esters such as the monoglycerides and the mixture may be reacted to form the desired alkyds. These alkyds may be modified to provide their beta-amino crotonates as above described.

*Example V*

Substitute the ester of acetoacetic acid and lignoceryl alcohol or a mixture rich therein for the ester of acetoacetic acid and stearyl alcohol in Example I and proceed as in the former example. The product is beta-amino crotonate of lignoceryl alcohol.

While the foregoing examples are directed more particularly to the amination of the higher esters of beta-carbonyl acids or their enolic tautomers with gaseous ammonia or with the salts of ammonia, it will be apparent that various basic nitrogen compounds may be substituted therefor. For example, ammonia may be replaced by methyl amine, dimethyl amine, ethyl amine aniline, benzyl amine, etc., or the ammonium salts thereof such as the acetates, olalates, chlorates, etc. Naturally, many of these are non-volatile and must be dissolved in the reaction mixture or in a common solvent, such as methyl or ethyl alcohol.

*Example VI*

Admix ethyl aniline or the amine salts thereof and the acetoacetic ester of stearyl alcohol from Example I and heat the mixture to reaction temperature to form the corresponding phenyl substituted beta-amino derivative of stearyl crotonate. Methyl or ethyl alcohol may be used as a solvent for the reaction mixture, if so desired.

*Example VII*

Substitute ortho or para toluidine for ethyl aniline in Example VI and proceed as in the former example.

*Example VIII*

Substitute ethyl amine vapors or salts of ethyl amine, such as the acetate salt or the hydrochloride salt, for ammonia or its salts in Examples I or II and proceed as in the prior examples. The amino derivatives are the corresponding ethyl amino crotonates of the stearyl crotonate.

*Example IX*

Substitute butyl amine for ethyl amine in Example VIII and proceed as above to obtain butyl amino crotonates of stearyl alcohol or of polyethylene glycol.

*Example X*

Substitute dimethyl amine for ammonia in Example II and proceed as in that example. The product is polyethylene glycol ester of dimethyl amino crotonate.

*Example XI*

React methyl acetoacetate and cholesterol in a proportion of 15 moles of methyl acetoacetate per mole of cholesterol. The reaction is conducted on a steam bath. After a reasonable period (12 to 48 hours) excess methyl acetoacetate is distilled under vacuum at a temperature below 140° C., e.g., 120° C., to recover cholesteryl acetoacetate. Dissolve 33 grams of the latter ester in 100 grams of methanol containing 0.05 gram of ammonium acetate as a catalyst and bubble ammonia gas therethrough at or about room temperature for an hour, or until ammonia is no longer absorbed to any substantial degree and all or most of the beta-carbonyl ester has been transformed to amino crotonate ester. Beta-amino crotonate of cholesterol is recovered by distilling the methanol, preferably under vacuum (e.g., at a pressure of about 15 millimeters of mercury).

Obviously, ammonium acetate can be employed in this reaction in quantities to supply the ammonia required by the reaction.

*Example XII*

Substitute any of the alcohols listed in Table C for cholesterol in Example XI and proceed as in the latter example. The final products are the corresponding beta-amino derivatives of crotonic acid and the higher alcohols of the table.

The general conditions of reaction involved in the preparation of beta-amino derivatives of crotonic acid esters of higher alcohols from the corresponding beta-keto esters or the enolic forms thereof, have been alluded to, but will now be briefly summarized.

THE ESTERS EMPLOYED

The esters are of beta-carbonyl acids (or enolic tautomers) such as those of any of the acids listed in Table D, and any of the higher alcohols listed in Table C.

BASIC NITROGEN COMPOUNDS

Basic nitrogen compounds which can be reacted with the above captioned esters include any of those listed in Table E or others derived in accordance with the provisions of this specification.

CATALYSTS OF REACTION

Catalysts are optional but may be salts of ammonia or amines and organic or inorganic acids in substantially any economically feasible amount from traces up to amounts supplying the entire amount of basic nitrogen compound.

SOLVENTS

The solvents are optional in mixtures reasonably fluid under reaction conditions. Solvents are non-reactive with the components of the system. They include methyl alcohol, ethyl alcohol, isopropanol, acetone, cellosolves, toluene, etc.

TEMPERATURES

Temperatures of reaction may be from zero to about 100° C. or higher if the amino crotonic acid ester is stable at such temperatures.

TIME OF REACTION

May extend from five minutes to twelve hours or more.

PROPORTIONS OF REACTANTS

The proportions of ammonia or amines to beta-carbonyl ester of a higher alcohol are usually non-critical. At least a mole of the nitrogen compound per mole of the ester is usually employed but excesses are permissible. In the case ammonia, or a volatile amine is employed as a basic nitrogen compound, the excess merely bubbles off. Excesses of other nitrogen compounds can usually be eliminated by distillation. If low yields are permissible or a mixed product is desired, the proportion of nitrogen compound is reduced, e.g., to some such value as 0.25 molar percent.

Various uses of the beta-amino crotonates are contemplated as being within the scope of the present invention. For example, they may be used as surfactants to aid in improving emulsification or wetting characteristics of various materials. The introduction of the beta-amino crotonic acid radical by esterification into higher alcohol radicals also provides a convenient method of obtaining the latter in a form in which they are dispersible or soluble in such media as water. The beta-amino crotonic acid esters of higher alcohols as herein disclosed, in some instances, may be employed as emplsifying agents for fats and mineral oils and other materials. In other instances, it may be desirable to incorporate a fatty acid of a class comprising oleic acid, stearic acid, lauric acid, ricinoleic acid, palmitic acid, coconut oil acids and mixtures of any two or more of the foregoing. The fatty acids may be expected to react at least in part at room temperature or above, with the amine group of the beta-amino crotonic acid ester to form salts which may be regarded as being types of soaps. However, applicants do not necessarily restrict themselves to the use of the fatty acids in reacted state to form soaps. The use of said acids in reacted or non-reacted state with the beta-amino crotonic acid esters is contemplated.

Water dispersions or solutions of esters or sterols, higher fatty alcohols and the like may be employed in reactions of organic synthesis with other compounds. The water provides a common medium by means of which thorough contact between the reactants is obtained.

By way of illustration, the use of beta-keto esters of higher alcohols, per se, as emulsifying agents or as intermediates in the formation of emulsifying agents will now be described.

*Example XIII*

In accordance with this example, 100 grams of light mineral oil containing in solution 1 gram of the castor oil ester of beta-amino crotonate and 1.55 grams of fatty acids of a glyceride oil, such as is sold under the trade name of Aliphat 34B, were agitated, for example, in a commercial mill or blender, with 80 milliliters of distilled water. The resultant emulsion is of the oil-in-water type and has been tested successfully for stability by allowing it to stand for a period of one week.

*Example XIV*

In accordance with this test, 2 grams of the stearyl ester of beta-amino crotonic acid was dissolved in distilled water and the solution was dispersed with 100 milliliters of mineral oil of light grade to provide a water-in-oil emulsion of heavy cream-like consistency. This emulsion exhibited only very slight break, even after standing for one week. In the preparation of this emulsion of this example, it is to be noted that the stearyl ester of beta-amino crotonic acid is employed as the dispersing agent without the incorporation of fatty acids as aids. The example constitutes evidence that the beta-amino crotonic acid esters of higher alcohols are, per se, good emulsifying agents. It also indicates the solubility of the esters in water.

*Example XV*

In the tests involved in this example, 2 grams of castor oil ester of beta-amino crotonic acid was dissolved in 100 milliliters of water and the solution was emulsified with 100 milliliters of light mineral oil and 2 grams of fatty acids from a vegetable oil. Acids from such vegetable oils as cottonseed oil, soya oil, coconut oil, or the like may be employed as the adjuvants in the dispersion.

*Example XVI*

In this example, a light mineral oil and 3 grams of fatty acids of a vegetable oil were dispersed by means of a solution of 2 grams of the ester of beta-amino crotonic acid and polyethylene glycol dissolved in 100 milliliters of water. The emulsion broke only slightly after standing for one week. The beta-amino crotonic acid esters of higher alcohols may be employed to form emulsions in water of other hydrophobic unctuous materials than mineral oils. Materials contemplated include waxes, lanolin, glyceride oils, and fats and many others.

*Example XVII*

In this test, 100 grams of light mineral oil was successfully dispersed in 100 milliliters of water by the aid of 2 grams of beta-amino crotonic acid ester of butyl carbitol and 2 grams of fatty acids from a vegetable oil. The butyl carbitol of the beta-amino crotonate of this example is not strictly classifiable as containing 12 carbon atoms, however, it additionally contains two ether linkages. When employed in combination with fatty acids of a glyceride oil, it has been found to be an effective emulsifying agent.

The forms of the invention described are by way of illustration. It will be apparent to those skilled in the art that numerous modifications may be made therein without departure from the spirit of the invention or the scope of the appended claims.

This application is a continuation-in-part of copending application, Serial No. 280,646, filed April 4, 1952, now abandoned.

We claim:
1. A beta-amino crotonic acid ester of a cholesterol.
2. A beta-amino crotonate of stearyl alcohol.
3. A material as defined in claim 7 in which the nitrogen group of the beta-amino crotonate is —$NH_2$.
4. The polyethylene glycol ester of a beta-amino crotonic acid.
5. The ester of the triglyceride of ricinoleic acid and a beta-amino crotonic acid.
6. A beta-amino crotonate of a hydroxyl-containing alkyd resin which is a phthalic glyceride modified by a glyceride oil.
7. As a new material, a beta-amino crotonate of alcohols containing at least 12 carbon atoms and being selected from a class consisting of (A) alcohols resulting from hydrogenation of the carboxyl of a fatty acid of a glyceride oil, (B) alkyd resins which are the esterification products of phthalic anhydride, glycerol, and a glyceride oil acid, (C) a sterol selected from the class consisting of cholesterol, beta sitosterol, stigmasterol, cholestanol, epidehydroandrosterone, ergosterol, epicholestanol, coprostanol, cortisone, cholic acid, desoxycholic acid, (D) castor oil, and (E) polyethylene glycol.
8. A mixture of the material as defined in claim 7 and water.
9. An emulsion medium comprising an aqueous solution of the material defined in claim 7.
10. As a new material a hydrogen halide salt of a beta-amino crotonate as defined in claim 7.
11. A beta amino crotonic acid ester of an aliphatic monohydric alcohol containing at least 12 carbon atoms.

References Cited in the file of this patent
UNITED STATES PATENTS
Re. 23,398   Cusic et al. _____ Aug. 14, 1951

(Other references on following page)

| | | |
|---|---|---|
| 1,680,799 | Minnich | Aug. 14, 1928 |
| 2,403,619 | Skinner | July 9, 1946 |
| 2,418,908 | Skinner | Apr. 15, 1947 |
| 2,514,549 | Lincoln | July 11, 1950 |

FOREIGN PATENTS

| | | |
|---|---|---|
| 804,442 | Germany | Apr. 23, 1951 |

OTHER REFERENCES

Lapworth et al.: J. Chem. Soc. (London), 81 (1902), 1501–6.

Coffey et al.: J. Chem. Soc. (London, 1936), 856.–9.

Bennett: Concise Chemical and Technical Dictionary, page 873, published 1947, Chemical Publishing Company, Inc., Brooklyn, New York.